United States Patent [19]

Kojima et al.

[11] Patent Number: 4,704,998
[45] Date of Patent: Nov. 10, 1987

[54] MOUNTING STRUCTURE FOR CERAMIC SUB-COMBUSTION CHAMBERS

[75] Inventors: Takio Kojima; Masato Taniguchi, both of Aichi, Japan

[73] Assignee: NGK Spark Plug Co., Ltd., Aichi, Japan

[21] Appl. No.: 767,729

[22] Filed: Aug. 20, 1985

[30] Foreign Application Priority Data

Aug. 21, 1984 [JP] Japan ................... 59-126523

[51] Int. Cl.[4] ............................ F02B 19/00
[52] U.S. Cl. .................... 123/271; 123/193 H; 277/205; 277/206 R
[58] Field of Search ................ 123/270–273, 123/193 H; 277/205, 206 R, 136, 137, 236

[56] References Cited

U.S. PATENT DOCUMENTS

| | | | |
|---|---|---|---|
| 2,804,858 | 9/1957 | Schilling | 123/270 |
| 4,302,020 | 11/1981 | Morales | 277/205 |
| 4,426,966 | 1/1984 | Huther | 123/271 |
| 4,477,091 | 10/1984 | Adamek | 277/205 |

Primary Examiner—Craig R. Feinberg
Attorney, Agent, or Firm—Finnegan, Henderson, Farabow, Garrett and Dunner

[57] ABSTRACT

A structure for mounting a ceramic sub-combustion chamber unit which is formed of a chamber element and a mouthpiece element as a unit. The sub-combustion chamber unit being mounted by gasket each of which is of U-shaped cross section on mounting hole formed in a cylinder head.

3 Claims, 3 Drawing Figures

MOUNTING STRUCTURE FOR CERAMIC SUB-COMBUSTION CHAMBERS

FIELD OF THE INVENTION AND RELATED ART STATEMENT

This invention relates to an improvement in structure for mounting a ceramic sub-combustion chamber unit (hereinafter referred to as "sub-chamber") mounted in the interior of a sub-combustion chamber which is provided in a cylinder for internal combustion engines such as a Diesel engine and the like.

It has been a matter of research and development to employ ceramics which provide better insulating property and heat resistance in a sub-combustion chamber of a Diesel engine for improvement of combustion efficiency derived from heat shielding thereof and for prevention of the loss produced by welding effected on parts such as nozzles and the like, and communication ports in a main combustion chamber, which are exposed to a high temperature. Ceramics are, however, defective in thermal and shock resistance and provide a disadvantage in that they are susceptible to damage by thermal stress. To obviate the aforementioned difficulties, proposals have been made to provide an air layer in the perimeter of the sub-chamber, as a means for reducing thermal stress by obtaining a uniform temperature distribution to the sub-chamber.

A conventional means for preventing a mouthpiece from coming out by provision of an annular stud or the like is, however, somewhat advantageous in that ceramics are fiercely heated to weaken thermal stress but are not effective in providing a significant adiabatic effect. With due consideration of the sort of adiabative effect which will contribute to the thermal efficiency of an engine, it could be said that such means has failed to provide a significant adiabatic effect. Another conventional means for holding the mouthpiece by an O-ring also involves difficulty in sealing gas circumferentially thereof since it is not finished to close tolerances.

SUMMARY OF THE INVENTION

For mounting in a substantially cylindrical retention hole formed in a cylinder head a sub-chamber of outer diameter less than that of the retention hole, the sub-chamber which is formed by holding a chamber element and a mouthpiece element together as a unit is so mounted that the convex portion of a gasket with a U-shaped configuration is aligned with the axis of the sub-chamber on the periphery of the mouthpiece so that the sub-chamber is in alignment with the center of the retention hole thereby obtaining not only a uniform peripheral gap but an easily obtained gas sealing.

Further, the chamber element is provided with a gasket of U-shaped cross section radially arranged to axially seal it such as to define an independent air adiabatic layer which prevents gas from gaining access to the periphery of the sub-chamber. This will reduce the thermal stress derived from rapid thermal change and heat gradient and prevent particles such as unburned carbon and the like from the main combustion chamber from entering. The thus obtained improved adiabatic layer having good sealability functions not only to reduce thermal stress but also to contribute to improvements in thermal efficiency.

DETAILED DESCRIPTION OF THE PREFERRED EMBODIMENTS

Figure 1:
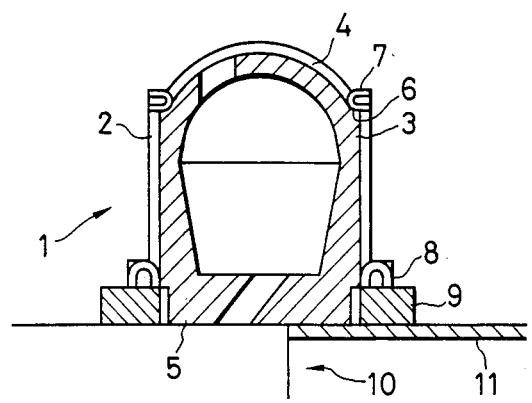
FIG. 1 is a view of a first embodiment of the invention.

FIG. 1 is a representation showing a first embodiment of the invention.

A sub-chamber 3 of silicon nitride has an outer diameter less than that of a substantially cylindrical retention hole 2 formed in a cylinder head and is mounted in the hole. The sub-chamber 3 is formed by holding a chamber element 4 and a mouthpiece 5 together as a unit. The chamber element includes a shoulder 6 which is provided with a gasket 7 of U-shaped cross section with its convex axially arranged. The mouthpiece provides another gasket 7 of U-shaped cross section with its convex oriented axially of the sub chamber and facing toward the chamber element. A heat shielding ring 9 of heatresistant materials such as ceramics and the like is mounted on the side of a main chamber of cylinder head to prevent loss of the gasket 8 at the time of the welding required when combustion gas at a high temperature in a main combustion chamber is directly applied to the gasket. The gasket has a thickness of about 0.2 mm and is made of a material which conforms to the Japanese Industrial Standard (JIS) No. SUS430 and is preferably forced into place with its semi-circular crown laid innermost. The sub chamber obtained in this manner obtains a good gas sealing condition and provides the gas with high heat resistance. The sub-chamber is capable of maintaining elastic sealing of the gasket. Numerals 10 and 11 designate a cylinder and a cylinder gasket, respectively.

Figure 2:
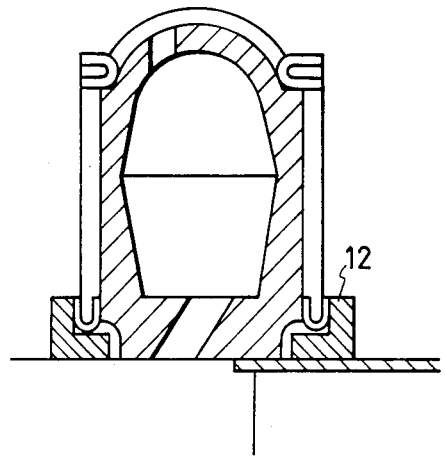
FIG. 2 is a representation of a second embodiment of the invention.

FIG. 2 is a view showing a second embodiment of the invention.

In this instance, the mouthpiece and the gasket provided therefor are such that the latter is shrinkage fitted into the mouthpiece on the periphery thereof with its crown of U-shaped cross section oriented to the side of the cylinder main chamber of the mouthpiece and is then set in the same manner as in the first embodiment, and that a heat shielding ring 12 of L-shaped cross section is forced into the cylinder head to establish a positional relation as shown in FIG. 2. This will reduce the number of machining steps required for the parts on the side of the head and render mounting simple.

Figure 3:
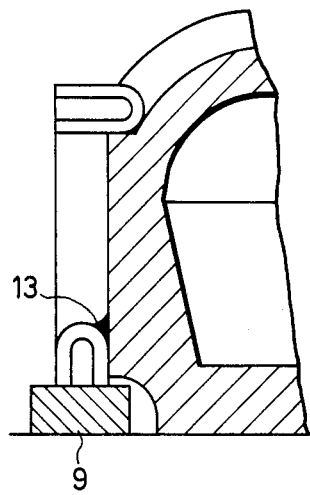
FIG. 3 is a view showing a third embodiment of the invention.

FIG. 3 is a representation showing a third embodiment of the invention.

In this instance, the gasket is soldered at 13 to the mouthpiece of the sub-chamber with its convex of U-shaped shaped cross section oriented axially. The gasket is adapted to solder its one side in contct with the sub-chamber for greatly improving reliability of pealing since one side is subjected to a higher temperature than a temperature at which the other side is in contact with the head, the other side being readily subjected to a permanent set in fatigue. The heat shielding ring 9 may be mounted after insertion of the sub-chamber or simultaneously with insertion thereof. The other gasket used in the chamber element is arranged in the same manner as in the first embodiment. The heat shielding ring may also be of L-shaped cross section as discussed about the second embodiment and disposed to establish a positional relation shown in FIG. 2.

According to the embodiment of the invention, one gasket of L-shaped cross section is provided in the mouthpiece with its convex oriented axially of the sub chamber whereas the other gasket of U-shaped cross section is mounted on the chamber element with its convex oriented axially of the sub-chamber, the mouthpiece element being provided with the heat shielding ring. Great advantages are derived therefrom in such a function that the gaskets are prevented from involving its loss by welding and maintain substantial airtightness therebetween, and that temperature distribution is uniformed in the sub-chamber, and that the sub-chamber is capable of improving heat insulating property and combustion efficiency and of holding its elasticity as it is.

We claim:

1. A subsidiary combustion chamber for an internal combustion engine comprising:

a cylinder head having a retention hole of a selected normal diameter and a first axially extending portion of increased diameter at one end thereof to form a first shoulder, said cylinder head having a second shoulder extending radially at the opposite end of said retention hole;

a heat shielding annular ring disposed in said first axially extending portion in engagement with said first shoulder, said ring having an outer diameter corresponding substantially to the diameter of said first axially extending portion and an inner diameter less than said normal diameter of said retention hole;

a ceramic sub-combustion chamber unit disposed in said retention hole, said unit including a mouthpiece element and a chamber element and having an outer diameter less than the normal diameter of said retention hole, said chamber element having a third shoulder substantially parallel said second shoulder, said unit having a length dimension less than a depth dimension of said retention hole to form a space between said second and third shoulders;

a first annular gasket disposed in said space between said second and third shoulders, said first gasket being of U-shaped cross section with a convex portion facing inwardly and leg portions in engagement with said second and third shoulders to sealingly space said chamber element in said retention hole, said first gasket being fixed to said sub-combustion chamber prior to said sub-combustion chamber being disposed in said retention hole; and a second annular gasket disposed between said mouthpiece element and said retention hole, said gasket being of U-shaped cross section with a convex portion facing away from said heat shielding ring and leg portions in engagement with said retention hole, said heat shielding ring, and said mouthpiece element to sealingly space said mouthpiece element in said retention hole, said second gasket being fixed to said sub-combustion chamber prior to said sub-combustion chamber being disposed in said retention hole.

2. A subsidiary combustion chamber as recited in claim 1, wherein said second annular gasket is soldered to said mouthpiece element.

3. A method of providing a cylinder head with a subcombustion chamber comprising the steps of:

forming a retention hole in said cylinder head having a peripheral surface of a selected diameter and an axially extending portion of an increased diameter to form a first shoulder;

forming in the peripheral surface a second radially extending shoulder spaced from said first shoulder adjacent the opposite end of said retention hole;

forming a sub-combustion chamber having a portion positioned to form a third shoulder substantially parallel to said second shoulder upon the positioning of said sub-combustion chamber in said retention hole;

fixing a first annular U-shaped gasket having a convex portion and leg portions to said sub-combustion chamber positioned with the convex portion facing inwardly in engagement with the sub-combustion chamber and the leg portions facing outwardly;

fixing a second annular U-shaped gasket having a convex portion and leg portions to the sub-combustion chamber with the convex portion opposing the first gasket and the leg portions extending substantially perpendicular to the first gasket leg portions;

positioning the sub-combustion chamber in said retention hole with the leg portions of said first gasket engaging said second shoulder of said cylinder head and with said leg portions of said second gasket engaging the periphery of said retention hole to space said sub-combustion chamber from said cylinder head; and placing a sealing ring surrounding said retention hole in engagement with said leg portions of said second gasket to seal the space between said sub-combustion chamber and said cylinder head.

* * * * *